US00RE37998E

(19) United States
(12) Reissued Patent
Combes et al.

(10) Patent Number: US RE37,998 E
(45) Date of Reissued Patent: Feb. 18, 2003

(54) COLORED GLASS COMPOSITIONS AND GLAZINGS PRODUCED THEREWITH

(75) Inventors: Pierre Combes, deceased, late of Vanves (FR), by Jacqueline Combes, legal administrator; Jean-Jacques Massol, Asnieres (FR); Pedro Casariego Alvarez, Salinas (ES)

(73) Assignee: Saint-Gobain Vitrage (FR)

( * ) Notice: This patent issued on a continued prosecution application filed under 37 CFR 1.53(d), and is subject to the twenty year patent term provisions of 35 U.S.C. 154(a)(2).

(21) Appl. No.: 08/720,370

(22) Filed: Sep. 27, 1996

Related U.S. Patent Documents

Reissue of:
(64) Patent No.: 5,352,640
Issued: Oct. 4, 1994
Appl. No.: 08/044,554
Filed: Apr. 7, 1993

(63) Continuation of application No. 07/682,497, filed on Apr. 9, 1991, now abandoned.

(30) Foreign Application Priority Data

Apr. 13, 1990 (FR) ..... 90 04805

(51) Int. Cl.[7] ..... C03C 3/087; C03C 4/08

(52) U.S. Cl. ..... 501/71; 501/70; 501/904; 501/905; 428/426; 428/428; 428/432

(58) Field of Search ..... 501/70, 71, 904, 501/905, 14; 428/426, 428, 432

(56) References Cited

U.S. PATENT DOCUMENTS

| | | | | |
|---|---|---|---|---|
| 2,418,684 A | | 4/1947 | Yauel et al. | 106/52 |
| 2,524,719 A | | 10/1950 | Tillyer | 501/71 |
| 2,860,059 A | | 11/1958 | Molter et al. | 106/52 |
| 2,892,726 A | | 6/1959 | Smith et al. | 106/52 |
| 2,938,808 A | | 5/1960 | Duncan et al. | 106/52 |
| RE25,312 E | | 1/1963 | Duncan et al. | 106/52 |
| 3,291,585 A | | 12/1966 | Okamura et al. | 65/18 |
| 3,294,556 A | | 12/1966 | Harrington et al. | 106/52 |
| 3,296,004 A | | 1/1967 | Duncan et al. | 106/52 |
| 3,296,005 A | | 1/1967 | Duncan et al. | 106/52 |
| 3,300,323 A | | 1/1967 | Plumat et al. | 106/52 |
| 3,498,806 A | | 3/1970 | Hammer et al. | 106/52 |
| 3,628,932 A | | 12/1971 | Inoue et al. | 65/18 |
| 3,723,142 A | | 3/1973 | Kato et al. | 106/52 |
| 4,104,076 A | | 8/1978 | Pons | 106/52 |
| 4,190,452 A | | 2/1980 | Fischer et al. | 106/52 |
| 4,336,303 A | | 6/1982 | Rittler | 428/334 |
| 4,500,567 A | | 2/1985 | Kato et al. | 427/255.3 |
| 4,525,462 A | | 6/1985 | Behr | 501/71 |
| 4,792,536 A | | 12/1988 | Pecoraro et al. | 501/70 |
| 4,873,206 A | | 10/1989 | Jones | 501/71 |
| 4,971,843 A | | 11/1990 | Michelotti et al. | 428/34 |
| 5,023,210 A | | 6/1991 | Krumwiede et al. | 501/71 |
| 5,278,108 A | | 1/1994 | Cheng et al. | 501/71 |
| 5,308,805 A | * | 5/1994 | Baker et al. | 501/71 |
| 5,318,931 A | | 6/1994 | Nakaguchi et al. | 501/64 |
| 5,346,867 A | * | 9/1994 | Jones et al. | 501/70 |
| 5,352,640 A | | 10/1994 | Combes et al. | 501/71 |
| 5,393,593 A | | 2/1995 | Gulotta et al. | 428/220 |
| 5,411,922 A | * | 5/1995 | Jones | 501/70 |
| 5,545,596 A | * | 8/1996 | Alvarez Casariego et al. | 501/70 |

FOREIGN PATENT DOCUMENTS

| | | | | |
|---|---|---|---|---|
| EP | 0297404 | | 6/1988 | |
| EP | 0452207 | | 4/1991 | |
| FR | 2082647 | | 11/1971 | |
| FR | 2270215 | | 4/1975 | |
| FR | 75 34952 | | 11/1975 | |
| FR | 91 12164 | | 4/1993 | |
| GB | 803927 | | 11/1958 | |
| GB | 1163482 | * | 9/1969 | 501/71 |
| GB | 1331492 | | 6/1970 | |
| GB | 1512704 | | 6/1978 | |
| GB | 2071082 | | 9/1981 | |
| GB | 2162835 | | 2/1986 | |
| GB | 2260978 | | 5/1993 | |
| JP | 57-106537 | | 7/1982 | |
| JP | 63-40743 | | 2/1988 | |
| WO | 91/07356 | | 5/1991 | |
| WO | 91/11402 | | 8/1991 | |

OTHER PUBLICATIONS

Chemical Abstracts, vol. 98, No. 2, Jan. 10, 1983, No. 745D, p. 177.
Chemical Abstracts, vol. 88, No. 24, Jun. 12, 1978, No. 175980P, p. 356.
Chemical Abstracts, vol. 107, No. 18, Nov. 2, 1987, No. 160079P, p. 371.

* cited by examiner

*Primary Examiner*—Karl Group
(74) *Attorney, Agent, or Firm*—Pennie & Edmonds LLP

(57) ABSTRACT

The invention relates to a colored glass composition for producing glazings for use, e.g., as automobile sunroofs. The colored glass according to the invention is a soda-lime-silica glass comprising, as coloring agents, 1.4 to 4% iron oxide expressed as $Fe_2O_3$ and 0 to 0.05 % cobalt oxide, with the cobalt oxide exceeding about 0.02% when the $Fe_2O_3$ is below about 2% and, optionally, selenium and chromium oxide, whereby the sum of the $CoO+Se+Cr_2O_3$ is preferably less than about 0.24% by weight. The glass of the invention has a total light transmission factor under illuminant A equal to or below approximately 20% and a total energy transmission factor equal to or below approximately 12% for a thickness of 3.85 mm.

35 Claims, No Drawings

COLORED GLASS COMPOSITIONS AND GLAZINGS PRODUCED THEREWITH

Matter enclosed in heavy brackets [ ] appears in the original patent but forms no part of this reissue specification; matter printed in italics indicates the additions made by reissue.

This is a continuation of application Ser. No. 07/682,497, filed Apr. 9, 1991, now abandoned.

FIELD OF THE INVENTION

The present invention relates to glass compositions used in the production of colored glazings, particularly for motor vehicle sunroofs.

BACKGROUND OF THE INVENTION

Now, more than ever before, automobile designers are incorporating into their designs glazings formed of colored glass which have both a functional purpose and an attractive appearance. This tendency is confirmed by the ever increasing glazed surface of new automobile models compared with older types.

As a result, the greenhouse effect is an important factor which must be taken into account in determining the air conditioning requirements for such automobiles. This is more particularly true in the case of cars equipped with glass sunroofs. In an attempt to reduce this greenhouse effect, numerous unsuccessful attempts have previously been made by those skilled in the art to produce colored glass compositions having the low light and energy transmission properties offered by the glasses of the present invention.

SUMMARY OF THE INVENTION

The present invention is directed to glass compositions which are highly colored, particularly grey-blue or green glasses, which are suitable for the applications described above. For a given thickness, these glasses have a very low total light transmission and total energy transmission.

According to the invention, these attributes are obtained with the use of a colored glass formulation comprising the following constituents in the weight proportions defined by the following limits:

| | |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5% |

wherein the total amount of the alkaline earth oxides ranges between 6 and 16% by weight and further wherein the total amount of alkali metal oxides is between 10 and 20% by weight. At least one of $Al_2O_3$, $B_20_3$, MgO or $K_2O$, each in an amount of up to 5% (0.05) by weight, therefore may be employed. The glass compositions of the invention also incorporate, as coloring agents:

| | |
|---|---|
| $Fe_2O_3$ (total iron) | 1.4 to 4% |
| CoO | 0 to 0.05%. |

The amount of CoO is preferably greater than about 0.02% by weight when the amount of $Fe_2O_3$ is less than about 2% by weight. Optionally, selenium and/or chromium oxide may also be added to the glass composition to provide additional coloration. The sum of CoO+selenium+$Cr_2O_3$ is preferably no greater than 0.24. The glass of the invention has a total light transmission factor under illuminant A (i.e., designated as "$TL_A$") less than or equal to about 20% and a total energy transmission factor (i.e., "$T_E$") equal to or below approximately 12% at a "standard" glass thickness of 3.85 mm.

DETAILED DESCRIPTION OF THE PREFERRED EMBODIMENTS

Glazings formed with the glasses produced according to the invention are produced under conditions such that their redox potential, i.e., defined as the ratio of the ferrous oxide to the total quantity of iron, both expressed in the form of ferric oxide, ranges between about 0.16 and 0.40. Most of the glasses according to the invention, i.e., at least those having an iron content equal to or above approximately 2%, are produced in electric furnaces. The remaining compositions are compatible with conventional reverberatory furnaces.

For a given thickness, the colored glasses according to the invention preferably have a total light transmission below about 15%, or more preferably below 12%. The total energy transmission of these glasses is generally below about 8%.

In order to obtain the desired optical characteristics, particularly the aforementioned light and energy transmission values, the percentage of the coloring agents in the glass is adjusted, depending upon the thickness of the glass.

Thus, for a thickness of 3.85 millimeters, the colored glasses formed according to the invention can incorporate iron oxide as the sole coloring agent when the total content of this material, expressed as $Fe_2O_3$, is greater than about 3%. For such glasses, the production conditions are controlled in a manner known to those in the art such that their redox potential remains preferably equal to or below 0.30. The dominant wavelength of the glass thus obtained, when illuminated under illuminant C, is between about 500 and 570 nanometers.

For the same thickness, colored glasses produced according to the invention having a total iron oxide content (expressed as $Fe_2O_3$) equal to or below about 3%, may further comprise cobalt oxide as an additional coloring agent.

Thus, in one embodiment of the invention, the colored glass comprises between about 2 and 3% $Fe_2O_3$, approximately 140 to 400 ppm of CoO and optionally up to 50 ppm of selenium.

In general, such glasses have a dominant wavelength under illuminant C of between about 485 and 505 nm. Their total energy transmission factor is equal to or below approximately 10% and is generally between 4 and 6.5%. The excitation purity of these glasses under illuminant C is generally below about 30%. The glasses of the invention, which have a particularly low total light transmission factor, can have a relatively high excitation purity without having an excessively detrimental action on the visual perception of the color neutrality of the glass.

In a further embodiment of the invention, the glass compositions may optionally have a lower content of cobalt oxide and selenium in accordance with the following weight proportions:

| | |
|---|---|
| $Fe_2O_3$ | 1.4 to 2.5% |
| CoO | 150 to 330 ppm |
| selenium | 10 to 35 ppm |

When illuminated under illuminant C, these glasses have a dominant wavelength between about 485 and 570 nm and their excitation purity is generally below 20%. Their total energy transmission factor is below 10% and is usually between 5 and 8%. Glasses with a dominant wavelength between 485 and 500 nm are preferred for aesthetic reasons.

For a thickness of 3.85 mm the colored glasses formed according to the invention with a total iron oxide content, expressed as $Fe_2O_3$, equal to or below about 2.5%, can incorporate cobalt oxide and chromium oxide.

Thus, in another embodiment of the invention, the colored glass may comprise between about 1.5 and 2.5% $Fe_2O_3$, between about 150 and 300 ppm of cobalt oxide and between 700 and 2000 ppm of chromium oxide. When illuminated under illuminant C, these glasses have a dominant wavelength between about 490 and 510 nm and an excitation purity of about 10 to 25%. Their total energy transmission factor is below 10% and in general between about 5 and 8%.

To form the glasses according to the invention, the basic composition used is conventional in the float glass industry. Coloring agents are added to the composition in sufficient proportions to make it possible, for a given thickness, to obtain the desired optical characteristics and appearance. The basic glass has the following formulation (in percent by weight):

| | |
|---|---|
| $SiO_2$ | 72.1% |
| $Al_2O_3$ | 0.74% |
| CaO | 8.90% |
| MgO | 3.79% |
| $Na_2O$ | 14.16% |
| $K_2O$ | 0.11% |
| $SO_3$ | 0.20% |

The coloring agents are added to the glass in place of a portion of the silica.

The various examples appearing in Tables I and II set forth below illustrate different combinations of coloring agents. The values for the optical characteristics indicated were measured on 3.85 mm thick glazings. These glasses were formed under conditions such that they have a redox potential preferably equal to or below 0.35.

For glasses containing iron and cobalt oxide as coloring agents and having between approximately 2 and 3% of iron, it is desirable to include at least about 140 ppm of CoO within a 3.85 mm thick glazing. At lower amounts of CoO, the light transmission of the glass tends to increase and can exceed 15%.

For glasses colored with selenium and iron and cobalt oxides, it is recommended to introduce at least 1.4% iron oxide for a 3.85 mm thick glazing. Below this percentage, the light and energy transmissions of the glass respectively exceed 15 and 12%.

The glass compositions set forth in Tables I and II below and the preceding remarks concerning certain combinations of coloring agents are provided only to illustrate the numerous variations which can be produced without passing outside the scope of the invention and are not meant to limit the invention in any manner.

The glass formulations of the invention are compatible for use with standard prior art procedures for producing float glass, provided that certain glasses, i.e., those having an iron content greater than or equal to about 2%, are produced in electrical furnaces. The thickness of the ribbon of glass obtained in the float glass process, e.g., by layering the molten glass on a tin bath, can vary between 2 and 10 mm and preferably between 3 and 6 mm, where the glass is intended for the production of a glazing for a sunroof.

Glazings obtained by cutting a ribbon of colored glass formed according to the present invention, optionally followed by bending to a desired shape, may be used directly for producing a sunroof for a car in such a way as to reconcile the aesthetic requirements with the requirements concerning passenger comfort As known in the art, such glazings may initially be surface treated or they may be combined with, e.g., a sheet of uncolored glass, an organic coating such as a polyurethane-based film with anti-lacerating properties, or a film ensuring a tight seal in the case of breakage. These glazings may also be locally coated with, e.g., an enamel coating.

Furthermore, glazings formed according to the invention can additionally be coated with at least one metal oxide layer such as tin oxide, obtained by a high temperature chemical deposition technique such as pyrolysis, e.g. in accordance with the process described in U.S. Pat. No. 4,500,567, which discloses thermally decomposing an organic tin compound, the disclosure of which is incorporated herein by reference or chemical vapor deposition (CVD) or by vacuum deposition, which processes are well known in the art. In the case of a glazing for use in forming the sunroof of a car, the metal oxide coating makes it possible to further improve the light and energy transmission properties of the glass.

TABLE I

| Glass composition | Coloring Agents (% by weight) | | | | |
|---|---|---|---|---|---|
| no. | $Fe_2O_3$ | CoO | Se | $Cr_2O_3$ | Fe(II)/Total Fe |
| 1 | 3.72 | — | — | — | 0.26 |
| 2 | 1.45 | 0.0280 | 0.0024 | — | 0.35 |
| 3 | 1.54 | 0.0234 | 0.0026 | — | 0.34 |
| 4 | 1.59 | 0.0245 | 0.0031 | — | 0.35 |
| 5 | 1.58 | 0.0234 | 0.0023 | — | 0.39 |
| 6 | 1.76 | 0.0300 | 0.0023 | — | 0.33 |
| 7 | 1.74 | 0.0290 | 0.0019 | — | 0.34 |
| 8 | 2.27 | 0.0310 | 0.0015 | — | 0.34 |
| 9 | 2.85 | 0.0272 | — | — | 0.31 |
| 10 | 2.81 | 0.0160 | — | — | 0.26 |
| 11 | 2.80 | 0.0203 | — | — | 0.35 |
| 12 | 2.91 | 0.0270 | — | — | 0.27 |
| 13 | 2.36 | 0.0250 | — | 0.15 | 0.30 |

TABLE II

| Glass | Optical Characteristics | | | |
|---|---|---|---|---|
| composition no. | $TL_A$ (%) | TE (%) | λ (nm) | $P_o$ (%) |
| 1 | 11.3 | 4.5 | 566 | 43.7 |
| 2 | 11.7 | 8.4 | 485 | 14.7 |
| 3 | 9.8 | 6.5 | 551 | 7.2 |
| 4 | 10.1 | 7.1 | 565 | 11.6 |
| 5 | 11.7 | 7.2 | 493 | 8.3 |
| 6 | 9.3 | 6.4 | 489 | 12.3 |

TABLE II-continued

| Glass composition no. | Optical Characteristics $TL_A$ (%) | TE (%) | λ (nm) | $P_o$ (%) |
|---|---|---|---|---|
| 7 | 11.1 | 7.5 | 485 | 19.3 |
| 8 | 7.8 | 4.5 | 488 | 20.3 |
| 9 | 8.2 | 4.2 | 489 | 25.7 |
| 10 | 13.5 | 6.3 | 502 | 10.8 |
| 11 | 9.7 | 4.5 | 494 | 17.3 |
| 12 | 10.2 | 5.4 | 490 | 22.4 |

We claim:

1. A glass composition for forming colored glazings consisting essentially of, in percent by weight, 64 to 75% $SiO_2$, 5 to 15% CaO, 10 to 18% $Na_2O$, at least one of $Al_2O_3$, $B_2O_3$, MgO or $K_2O$, each in an amount of up to 5% by weight and [CoO] as [a] coloring agent*s, CoO* in an amount of up to 0.05% by weight, [wherein the amount of CoO is greater than about 0.02% by weight when $Fe_2O_3$ is present in said composition in an amount less than 2% by weight, and] selenium in an amount up to about 0.005% *by weight*, and [as a coloring agent, 1.4 to 4% by weight] $Fe_2O_3$*in an amount of about 1.4 to 4% by weight*, wherein *CoO is present in an amount greater than about 0.02% by weight when $Fe_2O_3$ is present in an amount of less than 2% by weight, CoO is present in an amount of at least 0.014% by weight when $Fe_2O_3$ is preset in an amount of 2 to 3% by weight*, the amount of alkaline earth oxides is between about 6[–] *to* 16% by weight and the amount of alkali metal oxides is between about 10[–] *to* 20% by weight and wherein glazings formed of said composition when illuminated under Illuminant C, [has] *have* a dominant percentage light transmission between about 485–570 nm, and which *glazings* have a total light transmission factor under [illuminant] *Illuminant* A of less than 20% a total energy transmission factor of less than 12% when said glazings have a thickness of about 3.85 mm.

2. The composition of claim 1 which further [comprises] *consists essentially of* a color effective amount of chromium oxide as an additional coloring agent, wherein the total amount of CoO, selenium and $Cr_2O_3$ is less than about 0.24% by weight of said composition.

3. The composition of claim 2 which consists essentially of 2 to 3% by weight $Fe_2O_3$, 0.014 to 0.04 percent by weight CoO and up to 0.005% by weight selenium.

4. The composition of claim 2 which consists essentially of 1.4 to 2% by weight $Fe_2O_3$, 0.015 to [0.003] *0.033%* by weight CoO and 0.0010 to 0.0035% by weight selenium.

5. The composition of claim 2 which consists essentially of 1.5 to 2.5% by weight $Fe_2O_3$, 0015 to 0.030% by weight CoO and 0.07 to 0.2% by weight $Cr_2O_3$.

6. The composition of claim 1 wherein said $Fe_2O_3$ comprises between about 16 to 40% by weight of FeO.

7. The composition of claim 6 wherein said $Fe_2O_3$ is present in said composition in an amount between about 3–4% by weight.

8. A glazing comprising at least one colored glass sheet having the composition of claim 3.

9. A glazing comprising at least one colored glass sheet having the composition of claim 4.

10. A glazing comprising at least one colored glass sheet having the composition of claim 5.

11. A glazing comprising at least one colored glass sheet having the composition of claim 8.

12. The glazing of claim 8, 9, 10 or 11 wherein the thickness of said glazing is between about 2 and 10 millimeters.

13. The glazing of claim 12 wherein the thickness of said glazing is between about 3 and 6 millimeters.

14. The glazing of claim 13 which further comprises at least one metal oxide layer coated upon at least a portion of said glazing.

*15. A glass composition for forming colored glazings consisting essentially of, in percent by weight, about 64 to 75% $SiO_2$, about 5 to 15% CaO, about 10 to 18% $Na_2O$, at least one of $Al_2O_3$, $B_2O_3$, MgO, or $K_2O$, each in an amount of up to about 5% by weight, a coloring agent of $Fe_2O_3$ in an amount of about 1.4 to 4% by weight, an additional coloring agent of selenium in an amount effective to provide coloring to the composition, and, optionally, cobalt oxide or chromium oxide as additional coloring agents, wherein the amount of cobalt oxide, if present, is greater than about 0.02% by weight when $Fe_2O_3$ is present in an amount of less than 2% by weight and is at least 0.014% by weight when $Fe_2O_3$ is present in an amount of 2 to 3% by weight, the total amount of cobalt oxide, selenium and chromium oxide, if present in combination, is no greater than about 0.24% by weight, the amount of alkaline earth oxides is between about 6 to 16% by weight, the amount of alkali metal oxides is between about 10 to 20% by weight, and glazings formed of such compositions have a dominant percentage light transmission of between about 485 to 570 nm when illuminated under Illuminant C.*

*16. The composition of claim 15 wherein glazings formed of such compositions have a total light transmission factor under Illuminant A of less than about 20% when such glazings have a thickness of about 3.85 mm.*

*17. The composition of claim 15, wherein glazings formed of such compositions have a total energy transmission factor of less than about 12% when such glazings have a thickness of about 3.85 mm.*

*18. The composition of claim 15, wherein at least about 15 to 40% by weight of the $Fe_2O_3$ is present in the form of FeO.*

*19. The composition of claim 15, wherein additional coloring agents of cobalt oxide and chromium oxide are present.*

*20. The composition of claim 19, wherein the selenium is present in an amount of about 0.001 to 0.005% by weight, and the cobalt oxide is present in an amount of between about 0.014 to 0.04% by weight, and the chromium oxide is present in an amount of about 0.07 to 0.2% by weight.*

*21. A glazing comprising at least one colored glass sheet having the composition of claim 1.*

*22. A glazing comprising at least one colored glass sheet having the composition of claim 15.*

*23. The glazing of claim 22 having a thickness of between about 2 to 10 mm.*

*24. The glazing of claim 22 which further comprises at least one metal oxide layer coated upon at least a portion of said glazing.*

*25. A glass composition for forming colored glazings consisting essentially of, in percent by weight, about 64 to 75% $SiO_2$, about 5 to 15% CaO, about 10 to 18% $Na_2O$, at least one of $Al_2O_3$, $B_2O_3$, MgO, or $K_2O$, each in an amount of up to about 5% by weight, a coloring agent of $Fe_2O_3$ in an amount of about 1.4 to 4% by weight, at least two additional coloring agents of cobalt oxide and chromium oxide in amounts sufficient to provide additional coloring of the composition, and selenium as an optional additional coloring agent, wherein the amount of cobalt oxide is greater than about 0.02% by weight when $Fe_2O_3$ is present in an amount of less than 2% by weight, the total amount of cobalt oxide, selenium and chromium oxide, if present in*

*combination, is no greater than about 0.24% by weight, the amount of alkaline earth oxides is between about 6 to 16% by weight, the amount of alkali metal oxides is between about 10 to 20% by weight, and glazings formed of such compositions have a dominant percentage light transmission of between about 485 to 570 nm when illuminated under Illuminant C.*

*26. An automobile sunroof comprising at least one glazing according to claim 22.*

*27. An automobile sunroof comprising at least one colored glazing having a glass composition consisting essentially of, in percent by weight, about 64 to 75% $SiO_2$, about 5 to 15% CaO, about 10 to 18% $Na_2O$, at least one of $Al_2O_3$, $B_2O_3$, MgO, or $K_2O$, each in an amount of up to about 5% by weight, a coloring agent of $Fe_2O_3$ in an amount of about 1.4 to 4% by weight, and at least one additional coloring agent of selenium, optionally with cobalt oxide as an additional coloring agent, wherein the amount of cobalt oxide, if present, is greater than about 0.02% by weight when the $Fe_2O_3$ is present in an amount of less than 2% by weight and is at least 0.014% by weight when $Fe_2O_3$ is present in an amount of 2 to 3% by weight, the total amount of cobalt oxide, selenium and chromium oxide, if present in combination, is no greater than about 0.24% by weight, the amount of alkaline earth oxides is between about 6 to 16% by weight, the amount of alkali metal oxides is between about 10 to 20% by weight, and the glazing has a dominant percentage light transmission of between about 485 to 570 nm when illuminated under Illuminant C.*

*28. The sunroof of claim 27 wherein the glazing has a total light transmission factor under Illuminant A of less than about 20% when such glazings have a thickness of about 3.85 mm.*

*29. The automobile sunroof of claim 27, having a total energy transmission factor of less than about 12% at a thickness of about 3.85 mm.*

*30. The automobile sunroof of claim 27, wherein at least about 15 to 40% by weight of the $Fe_2O_3$ is present in the form of FeO.*

*31. The automobile sunroof of claim 27, wherein the two additional coloring agents of cobalt oxide and chromium oxide are present.*

*32. The automobile sunroof of claim 31, wherein the cobalt oxide is present in an amount of between about 0.014 to 0.04% by weight, the selenium is present in an amount of about 0.001 to 0.005% by weight, the chromium oxide is present in an amount of about 0.07 to 0.2% by weight or mixtures thereof.*

*33. The automobile sunroof of claim 27 which further comprises at least one metal oxide layer coated upon at least a portion of said glazing.*

*34. An automobile sunroof comprising at least one glazing according to claim 21.*

*35. An automobile sunroof comprising at least one colored glazing having a glass composition consisting essentially of, in percent by weight, about 64 to 75% $SiO_2$, about 5 to 15% CaO, about 10 to 18% $Na_2O$, at least one of $Al_2O_3$, $B_2O_3$, MgO, or $K_2O$, each in an amount of up to about 5% by weight, a coloring agent of $Fe_2O_3$ in an amount of about 1.4 to 4% by weight, at least two additional coloring agents of cobalt oxide and chromium oxide in amounts sufficient to provide additional coloring of the glazing, and selenium as an optional additional coloring agent, wherein the cobalt oxide is present in an amount of greater than about 0.02% by weight when $Fe_2O_3$ is present in an amount of less than 2% by weight, the total amount of cobalt oxide, selenium and chromium oxide, if present in combination, is no greater than about 0.24% by weight, the amount of alkaline earth oxides is between about 6 to 16% by weight, the amount of alkali metal oxides is between about 10 to 20% by weight, and the glazing has a dominant percentage light transmission of between about 485 to 570 nm when illuminated under Illuminant C.*

* * * * *

UNITED STATES PATENT AND TRADEMARK OFFICE

CERTIFICATE OF CORRECTION

PATENT NO. : RE 37,998 E 
DATED : March 5, 2003
INVENTOR(S) : Pierre Combes, Jeane-Jacques Massol and Casariego Alvarez It is certified that error appears in the above-identified patent and that said Letters Patent is hereby corrected as shown below:

Column 5,
Lines 36 and 37, insert -- about -- after the word "than";
Line 48, replace "0.0010 to 0.0035% by weight selenium" with -- 0.07 to 0.2% by weight $Cr_2O_3$ --.

Signed and Sealed this

Seventeenth Day of June, 2003

JAMES E. ROGAN
*Director of the United States Patent and Trademark Office*